(12) United States Patent
Herringshaw et al.

(10) Patent No.: US 9,338,943 B2
(45) Date of Patent: May 17, 2016

(54) REEL FINGER

(71) Applicant: Deere & Company, Moline, IL (US)

(72) Inventors: Brian Herringshaw, Bettendorf, IA (US); Joshua Pierson, Davenport, IA (US); Jesse R Neely, Annawan, IL (US)

(73) Assignee: DEERE & COMPANY, Moline, IL (US)

( * ) Notice: Subject to any disclaimer, the term of this patent is extended or adjusted under 35 U.S.C. 154(b) by 299 days.

(21) Appl. No.: 13/873,309

(22) Filed: Apr. 30, 2013

(65) Prior Publication Data

US 2014/0318097 A1 Oct. 30, 2014

(51) Int. Cl.
*A01D 57/00* (2006.01)
*A01D 57/02* (2006.01)

(52) U.S. Cl.
CPC ........................... *A01D 57/02* (2013.01)

(58) Field of Classification Search
CPC ............................. A01D 80/02; A01D 57/02
USPC ............. 56/14.3, 14.4, 16.1, 16.2, 17.3, 220, 56/364, 400, 400.16, 400.21, DIG. 20
See application file for complete search history.

(56) References Cited

U.S. PATENT DOCUMENTS

| | | | | |
|---|---|---|---|---|
| 3,796,030 | A * | 3/1974 | Neal et al. ........................ | 56/220 |
| 4,459,797 | A * | 7/1984 | Gessel et al. .................... | 56/220 |
| 4,520,620 | A * | 6/1985 | Gessel et al. .................... | 56/400 |
| 4,901,511 | A * | 2/1990 | Yarmashev et al. ............. | 56/220 |
| 6,199,357 | B1 * | 3/2001 | Bloom ............................. | 56/220 |
| 6,324,823 | B1 * | 12/2001 | Remillard ....................... | 56/220 |
| 7,934,365 | B2 * | 5/2011 | Schumacher et al. .......... | 56/400 |
| 2010/0281840 | A1 * | 11/2010 | Remillard ....................... | 56/220 |
| 2014/0260171 | A1 * | 9/2014 | McGehee et al. ............... | 56/400 |

* cited by examiner

*Primary Examiner* — Robert Pezzuto
*Assistant Examiner* — Mai Nguyen

(57) ABSTRACT

A finger (118) for mounting on a of an agricultural harvesting head has a front flange (212), a rear flange (214), a web (216) connecting the front flange (212) to the rear flange (214), and struts (218) that are formed integral with the web (216) and with the rear flange (214) and that extend in a transverse direction.

11 Claims, 7 Drawing Sheets

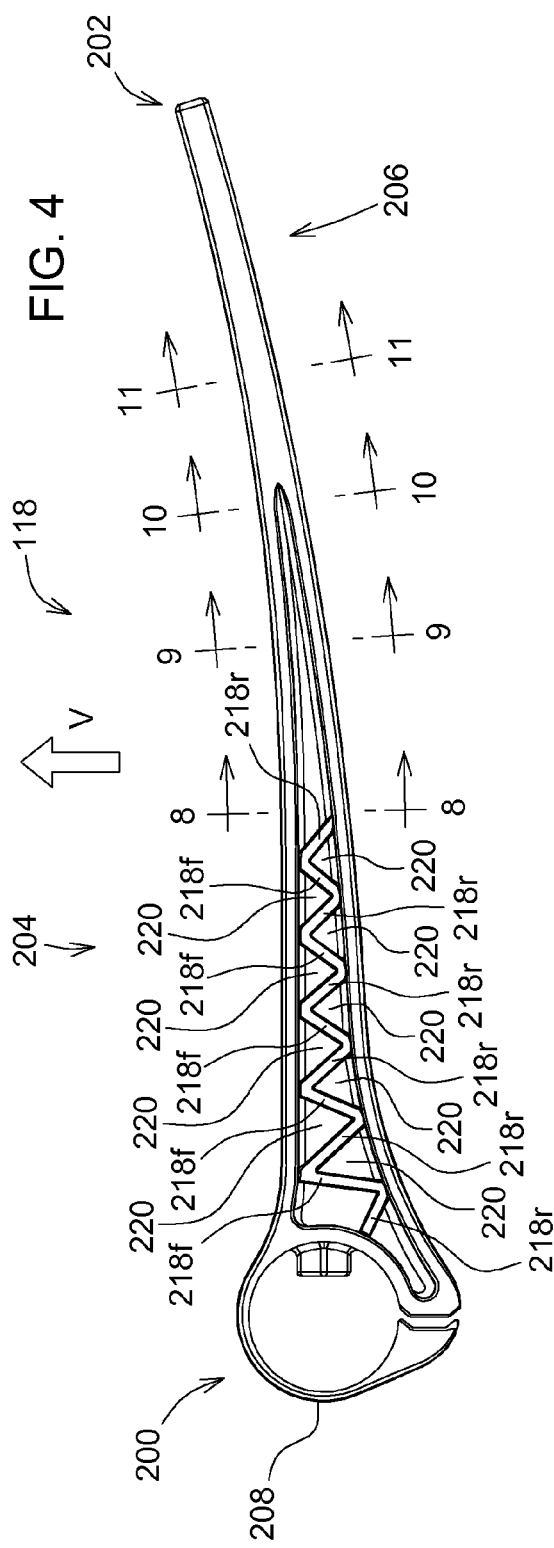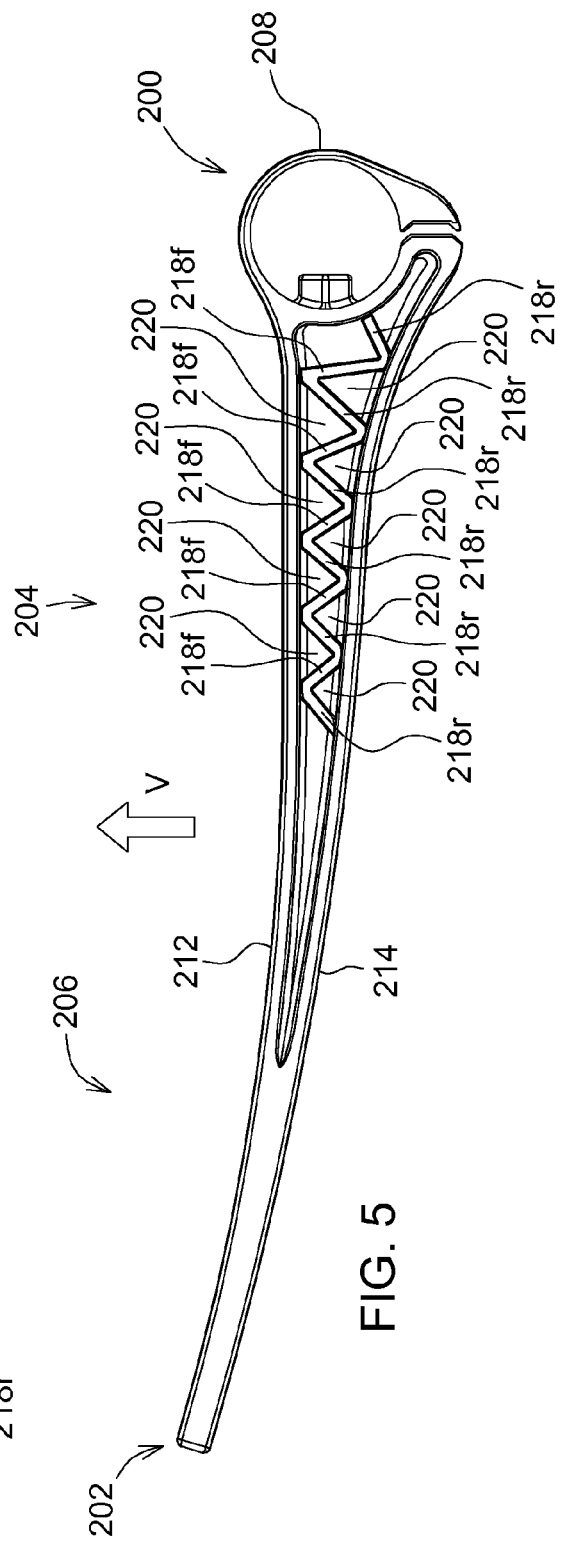

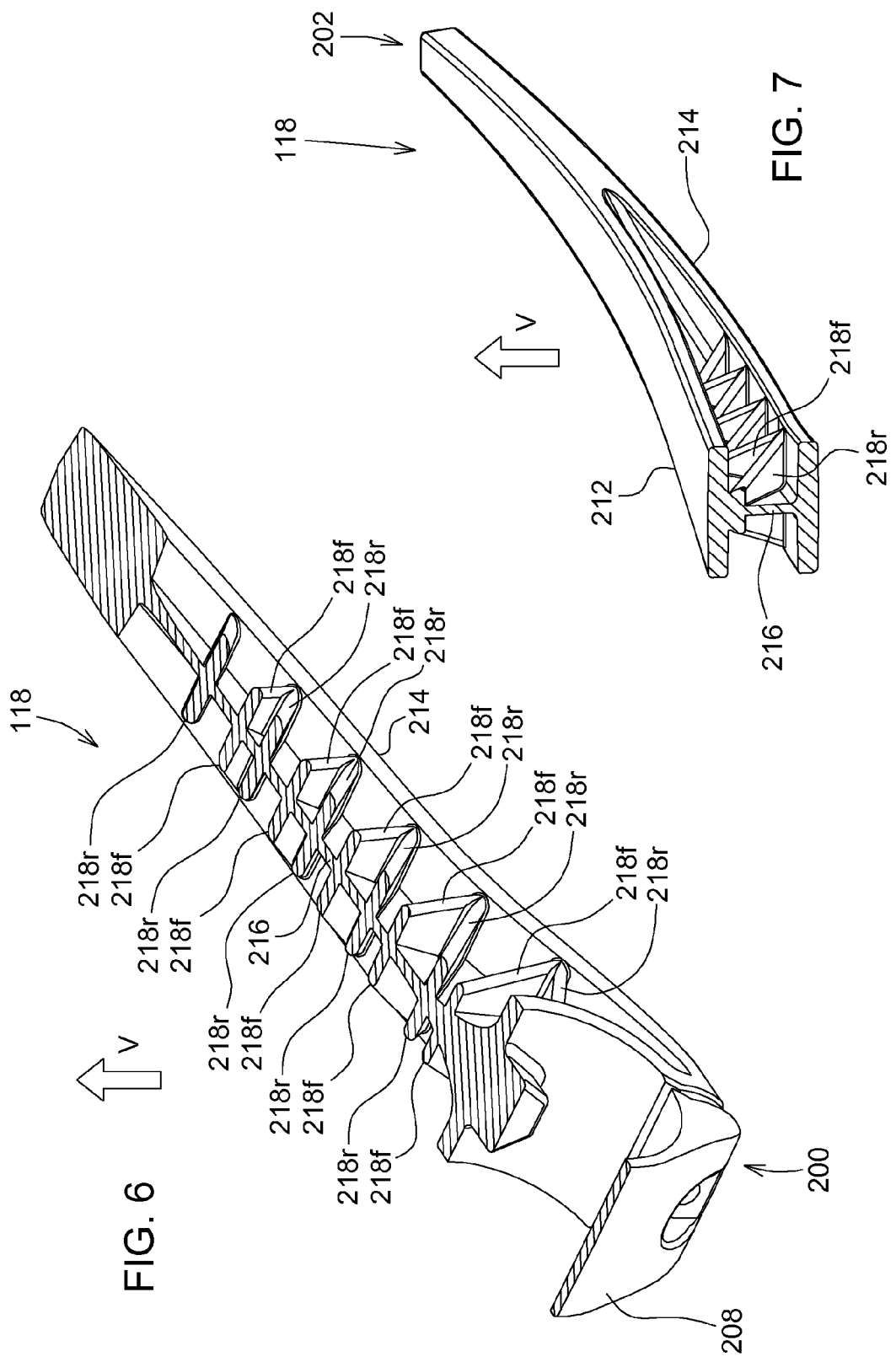

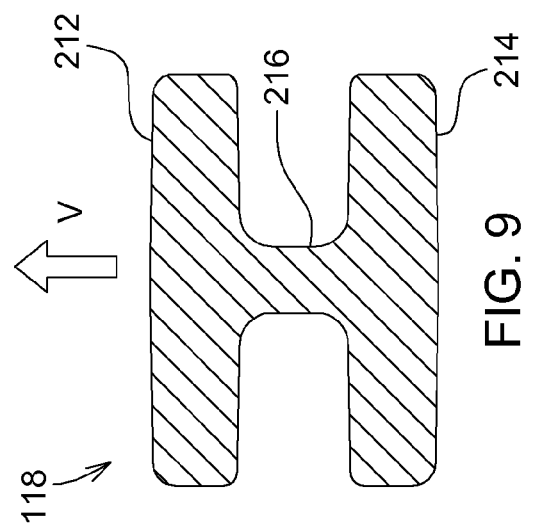
FIG. 8
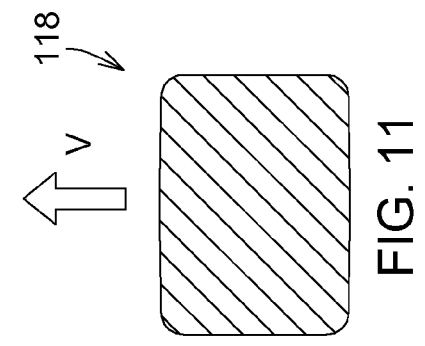
FIG. 10
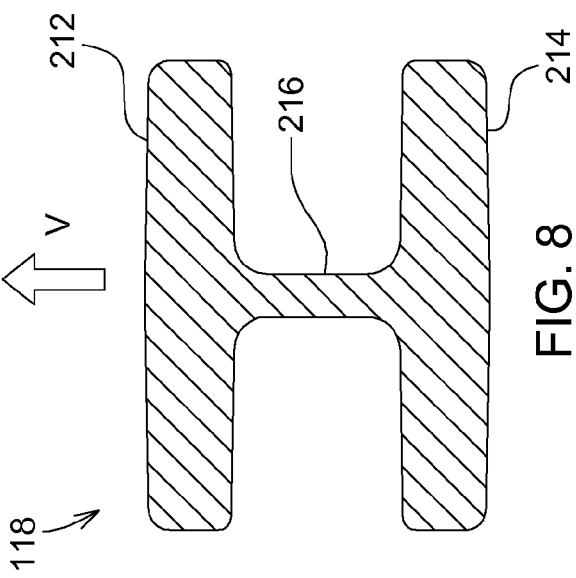
FIG. 9
FIG. 11

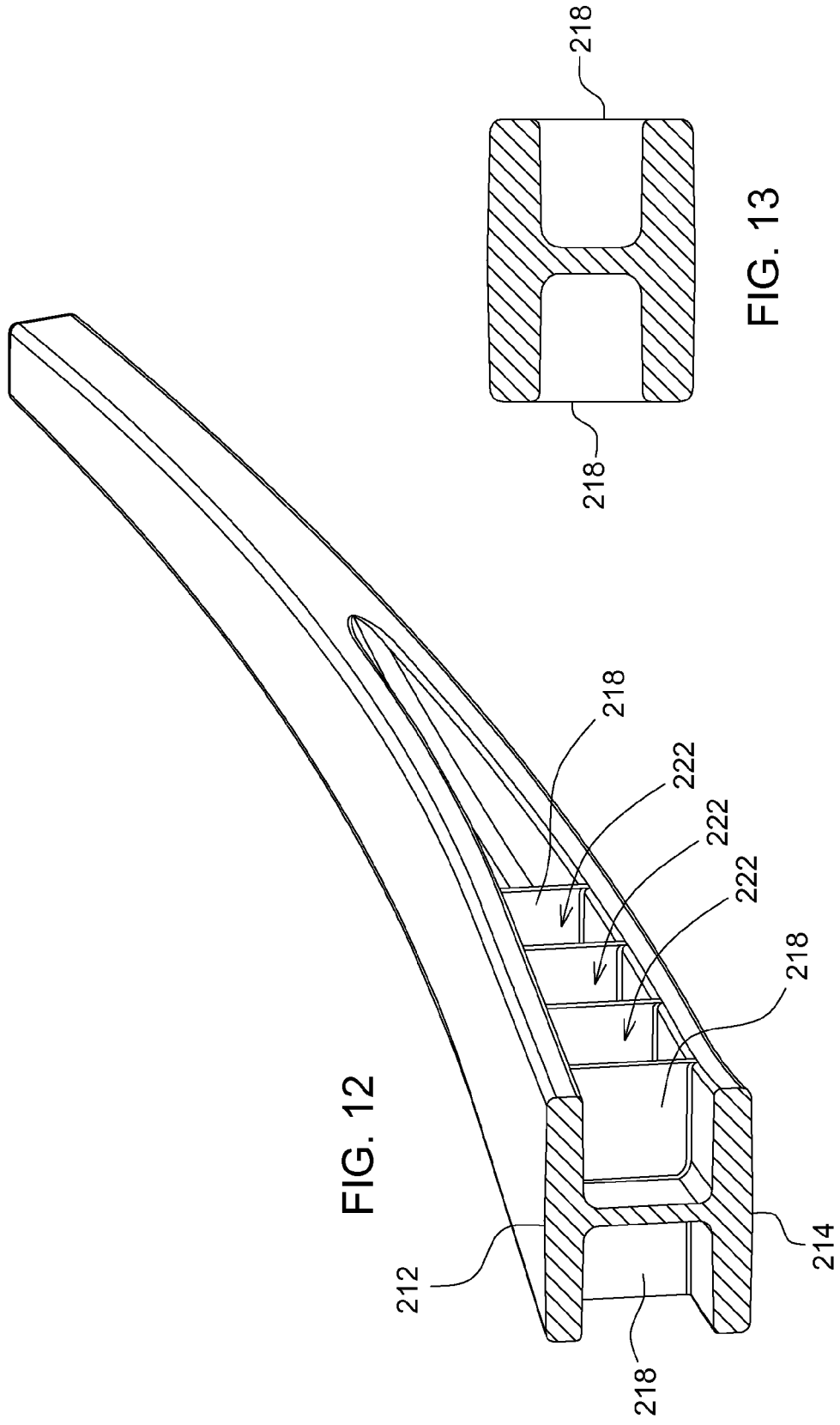

REEL FINGER

FIELD OF THE INVENTION

This invention relates to agricultural harvesting heads. More particularly it relates to reels for agricultural harvesting heads. Even more particularly, it relates to fingers disposed on the reel to engage the tops of crop plants that are harvested by the agricultural harvesting head.

BACKGROUND OF THE INVENTION

Agricultural harvesting heads use reels that extend forward from the agricultural harvesting head. The reels extend laterally, generally parallel to the longitudinal extent of the agricultural harvesting head. The reels are provided to engage the tops of crop plants as they approach a reciprocating knife that also extends across the entire width of the agricultural harvesting head. When the reciprocating knife severs the crop plants near their roots, elongate fingers on the reel engage the top of the crop plants, and direct the crop plants rearward so they fall upon the agricultural harvesting head rather than falling onto the ground.

Agricultural harvesting heads are being designed in greater and greater lengths. As the links of the agricultural harvesting heads increase, their weight also increases. It is beneficial to reduce the weight of any elements on the agricultural harvesting head, and therefore the reel as well.

What is needed is an improved finger for mounting on the reel that has reduced weight, and therefore reduces the total weight of the agricultural harvesting head. It is an object of this invention to provide a finger that is lighter than existing fingers yet provides at least as much strength as existing fingers. It is an object of this invention to provide a reel having such fingers.

SUMMARY OF THE INVENTION

In accordance with one aspect of the invention, a finger for an agricultural harvesting head is formed as an I-beam. The I-beam is defined by a forward flange and a rear flange that are coupled together with a web, wherein the web is strengthened by laterally extending struts.

In accordance with another aspect of the invention, a plurality of the fingers are supported on a bat.

In accordance with another aspect of the invention, a plurality of the bats are supported on bat supports to rotate about a longitudinal rotational axis.

In accordance with another aspect of the invention, the bat supports are supported on a central tube.

In accordance with another aspect of the invention, the central tube is reported for rotation about the longitudinal rotational axis on a left end supporting arm and a right end supporting are disposed at either end of the central tube.

In accordance with another aspect of the invention, a finger that is elongate and has a longitudinal extent, is provided for a reel of an agricultural harvesting head, the reel having a plurality of bats disposed about a longitudinal rotational axis, wherein each of the plurality of bats is configured to support a plurality of the fingers that are spaced apart and mounted side-by-side on each of the plurality of bats, the finger comprising a front flange that extends in a longitudinal and a transverse direction, a rear flange that extends in the longitudinal and the transverse direction and is spaced apart from the front flange, a web that extends between the front flange and the rear flange and is integrally formed with the front flange and the rear flange, and struts that are formed integral with the web and with the rear flange and that extend in a transverse direction.

Adjacent struts may form a triangular box with the front flange.

Adjacent struts may form a triangular box with the rear flange.

Adjacent struts may form a rectangular box with the front flange and the rear flange.

Adjacent struts may be generally parallel to each other and maybe perpendicular to the front flange and the rear flange.

The struts may extend in a lateral direction a greater distance adjacent to the rear flange than adjacent to the front flange.

Each pair of adjacent struts may meet at an acute angle at the front flange.

Each pair of adjacent struts may meet at an acute angle at the rear flange.

Each strut may be disposed at an acute angle with respect to the front flange, and maybe disposed at an acute angle with respect to the rear flange.

A thickness of the web in a transverse direction may be less than a thickness of the front flange in a fore-and-aft direction.

A thickness of the web in a transverse direction may be less than a thickness of the rear flange in a fore-and-aft direction.

An extent of the front flange and an extent of the rear flange in a transverse direction may be at least three times an extent of the web in the transverse direction.

An extent of the front flange and an extent of the rear flange in a transverse direction may be at least four times an extent of the web in the transverse direction.

BRIEF DESCRIPTION OF THE DRAWINGS

FIG. 4 is a left side view of the finger of FIG. 3.

FIG. 5 is a right side view of the finger of FIG. 3-4.

FIG. 6 is a longitudinal cross-section of the finger of FIGS. 3-5.

FIG. 7 is a cross-sectional view of the finger of FIGS. 3-6 taken in a direction perpendicular to the longitudinal extent.

FIGS. 8-11 are cross sectional slices of the finger of FIGS. 1-7 taken at section lines 8-8, 9-9, 10-10, and 11-11 in FIG. 4.

FIG. 12 is a cross-sectional perspective view through an alternative finger in which each of the struts of the embodiment of FIGS. 1-11 have been rotated about their midpoints to be perpendicular at each end with respect to the front flange and the rear flange of the finger.

FIG. 13 is a cross-section of the alternative finger of FIG. 12 taken between two adjacent struts that are disposed perpendicular to the front flange and the rear flange of the finger.

DETAILED DESCRIPTION

In the discussion below, the terms "front", "forward", "in front of" and the like refer to the direction of travel of the real fingers engage the crop. This direction is indicated in the Figures by the directional arrow marked "V". The direction "V" is generally perpendicular to the longitudinal extent of the finger, and perpendicular to the longitudinal extent of the bat on which the finger is designed to be mounted.

In the discussion below, the terms "rear", "rearward", "behind", "back", "backward" and the like refer to a direction opposite to the direction "V".

In the discussion below, the terms "lateral", "transverse", "side-to-side" and the like refer to a direction parallel to the longitudinal extent of the bats on which the is designed to be mounted.

In the discussion below, the terms "up", "upper", "higher" and the like refer to a direction towards the bat on which the finger is designed to be mounted.

In the discussion below, the terms "down", "downward", "lower", and the like refer to a direction away from the bat on which the finger is designed to be mounted.

Figure 1:
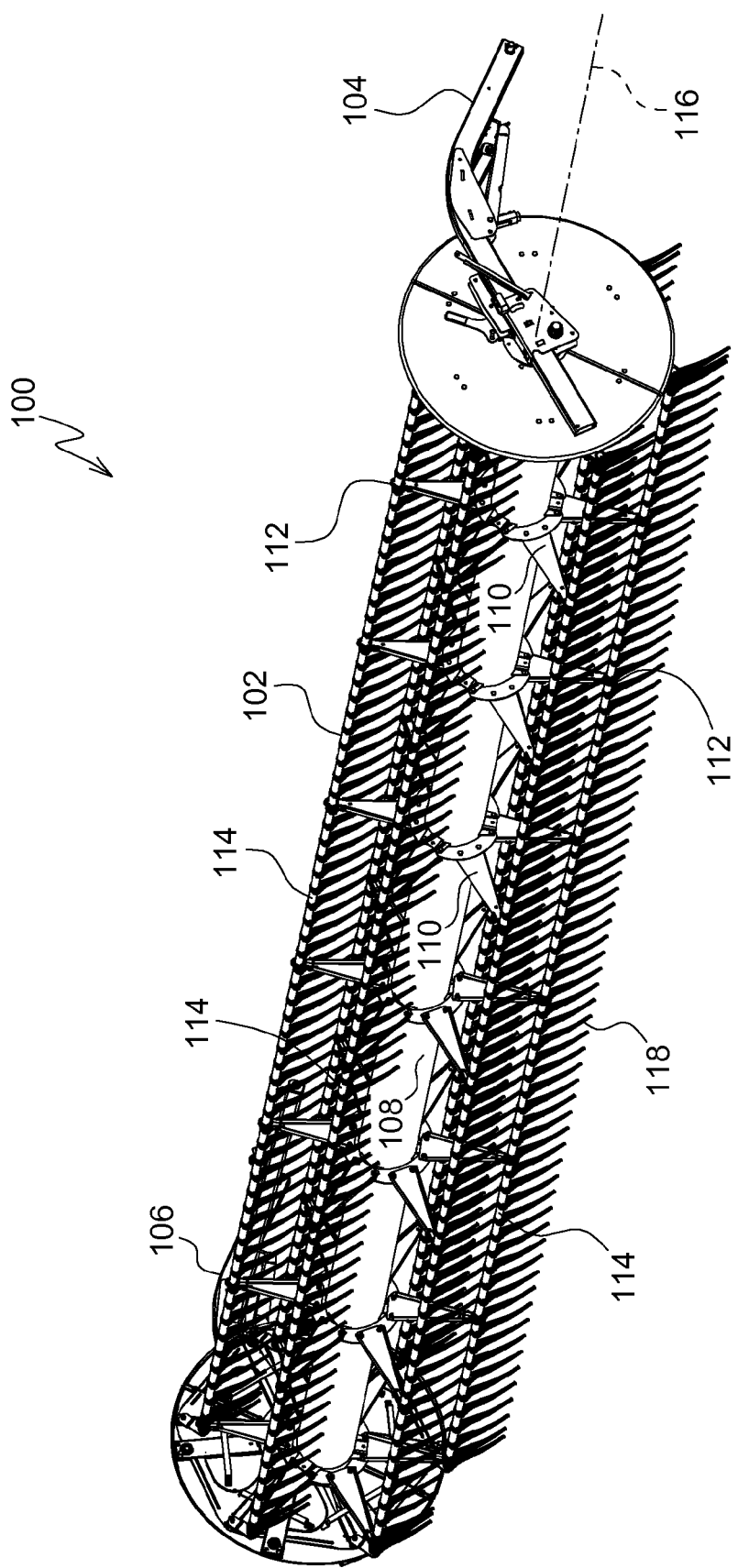
FIG. 1 is a perspective view of a reel for an agricultural harvesting head in accordance with the present invention.
Figure 2:
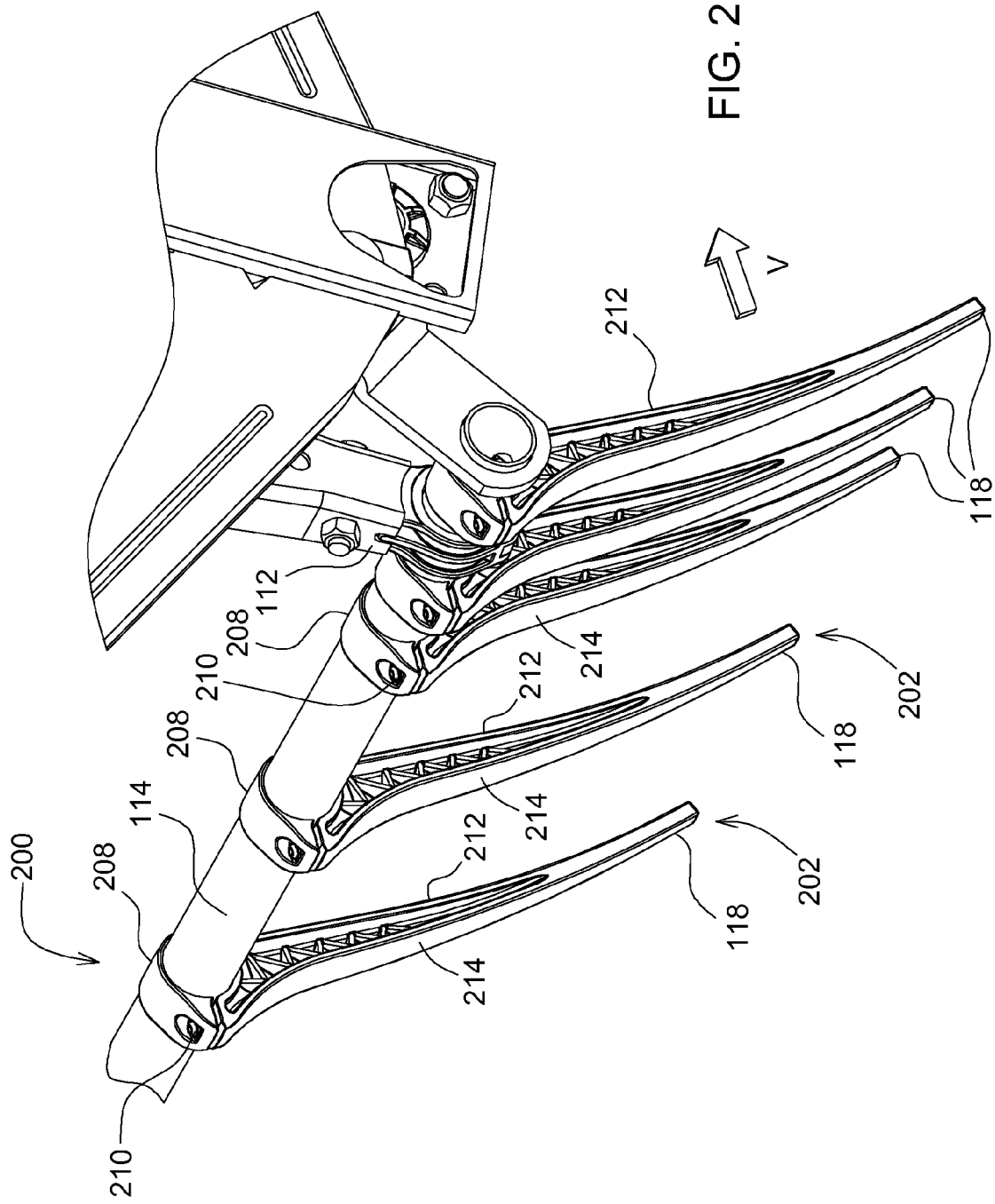
FIG. 2 is a close-up of a finger mounted to a bat on the reel of FIG. 1.
Figure 3:
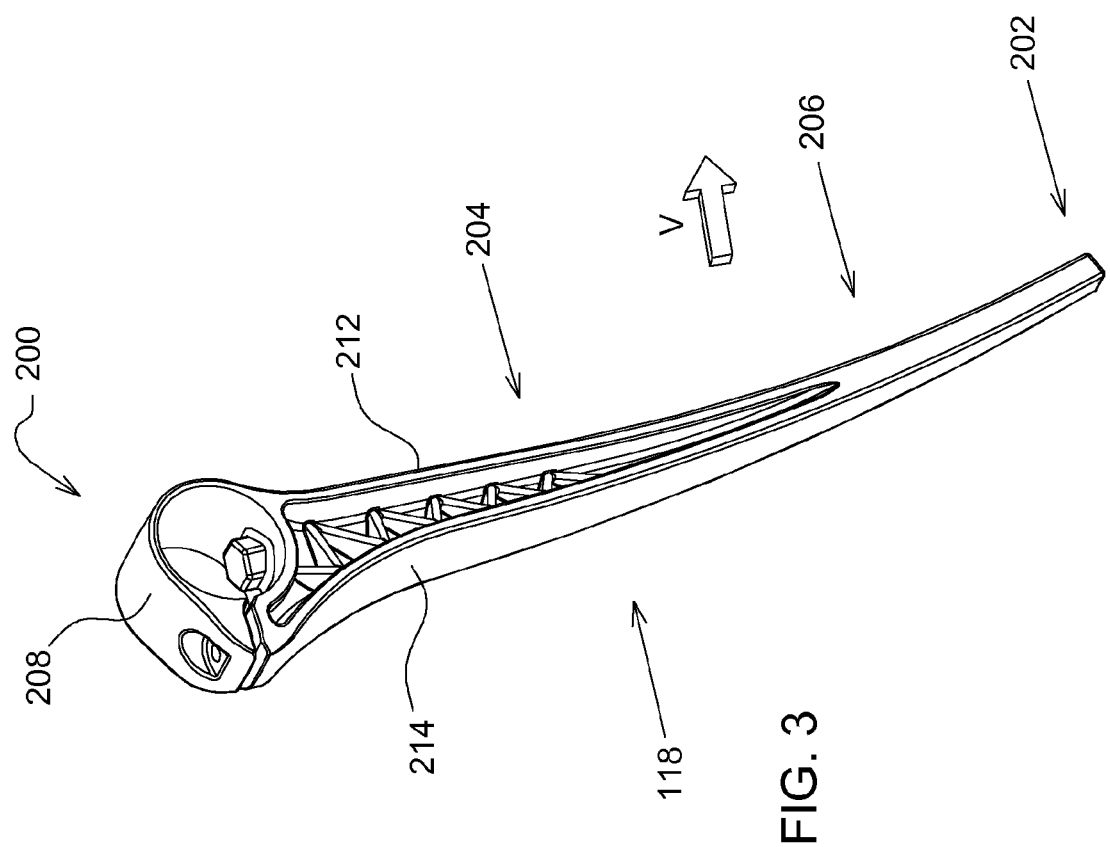
FIG. 3 is a view of the finger of FIG. 2 removed from the bat.

Referring now to FIG. 1, a reel assembly 100 for an agricultural harvesting head is shown. The reel assembly 100 includes a reel 102 that is elongate, to which a left end supporting arm 104, and a right end supporting arm 106 are attached.

The reel 102 is comprised of a central tube 108 that is elongate to which six bat supports 110 are attached. Each bat support 110 is spaced evenly apart from its adjacent bat support 110 along the length of the central tube 108. Each bat support 110 has six bat mounts 112.

Each of the bat mounts 112 on the bat support 110 supports six bats 114. Each bat mount 112 supports six bats 114 that are equiangularly spaced about the circumference of the central tube 108, and are equidistant from the longitudinal rotational axis 116 of the central tube 108.

Fingers 118 are fixed to each of the six bats 114. Each finger 118 on a bat 114 is spaced equidistantly from its adjacent fingers 118. The fingers 118 are distributed along substantially the entire length of each bat 114.

Finger 118 is an elongate member that has an upper end 200 that is configured to be fixed to bat 114, and a lower end 202 that is configured to engage the upper portions of crop plants.

Finger 118 tapers inwardly in a downward direction over substantially its entire length. Tapering occurs in a transverse direction, as well as a fore and aft direction.

FIG. 118 has an upper portion 204 that is in the form of an I-beam that extends in a direction parallel to the longitudinal extent of the finger 118. Finger 118 has a lower portion 206 that is solid in cross section.

The upper end 200 includes a strap 208 that extends about the bat 114, and is secured to itself with a fastener 210. Fastener 210 is a screw, bolt, or other threaded fastener. It may be a rivet or other flanged fastener made for permanent or semi-permanent attachment.

The upper portion 204 of finger 118 comprises a front flange 212 that extends laterally and longitudinally.

The upper portion 204 of finger 118 comprises a rear flange 214 that extends laterally and longitudinally.

The upper portion 204 of finger 118 comprises a web 216 that extends in a fore and aft direction and is integrally formed with the front flange 212 and the rear flange 214.

The front flange 212, the rear flange 214, and the web 216 form the I-beam structure.

The thickness of the web 216 in a transverse direction is less than the thickness of the front flange 212 in a fore-and-aft direction, and is less than the thickness of the rear flange 214 in a fore-and-aft direction.

The extent of the front flange 212 and the extent of the rear flange 214 in the transverse direction are three times greater than the extent of the web 216 in the transverse direction.

In another arrangement the extent of the front flange 212 and the extent of the rear flange 214 in the transverse direction are four times greater than the extent of the web 216 in the transverse direction.

The front flange 212, the rear flange 214, and the web 216 are configured as an I-beam, in which the front flange 212 and the rear flange 214 extend in a transverse direction more than a fore-and-aft direction, and the web 216 extends in a fore-and-aft direction more than the transverse direction. It is this transversely extending flange versus fore and aft extending web that gives the upper portion of the finger 118 its characteristic I-beam shape.

This I-beam shape changes, however, as the finger 118 extends downward. The upper portion 204 of finger 118 tapers inward from both side of the web in a lateral direction as it extends downwards. The lateral width of the front flange 212 decreases as it extends downwards. The lateral width of rear flange 214 decreases as it extends downward.

The upper portion 204 of finger 118 tapers in a fore-and-aft direction as it extends downwards. The fore-and-aft extent of the web 216 decreases as it extends downward.

The upper portion 204 of the finger 118 gradually transitions into the lower portion 206 of the finger 118 by changing its cross sectional profile over tiny increments of length. As the fore and aft extent of the web 216 decreases in a downward direction, the lateral width of the web 216 simultaneously increases. This transition is best shown in FIGS. 8, 9, 10, and 11.

FIGS. 8, 9, 10, 11, show successive cross-sectional slices of the finger 118 taken at section lines 8-8, 9-9, 10-10, and 11-11 in FIG. 4. Each successive cross-sectional slice is located further down on the longitudinal extent of the finger 118, Referring now to FIGS. 8, 9, 10, 11, in each successive figure, the transverse extent of the front flange 212 and the rear flange 214 are successively reduced. Furthermore, the transverse extent of the front flange 212 and the rear flange 214 are substantially the same at each cross-section. This pattern is the same over the entire length of the finger 118: the transverse extent of the front flange 212 and the rear flange 214 are substantially the same over the entire lengths of the front flange 212 and the rear flange 214.

The upper portion 204 of finger 118 comprises a plurality of struts 218. Each strut 218 is formed integral with the web 216 and extends laterally away from web 216 in a direction parallel to the bat 114. Each strut 218 is integrally formed with the rear flange 214 and extends forward away from the rear flange 214 toward the front flange 212.

In the arrangement illustrated in FIGS. 1-11, the transverse extent of each strut 218 is smaller at its forward end (e.g. where the strut 218 is adjacent to the front flange 212), as compared to the transverse extent of each strut 218 at its rear end (e.g. where the strut 218 is adjacent to the rear flange 214).

Under the typical loads experienced by the finger 118, the lower end 202 of the finger 118 is pushed backwards by the crop, placing the front flange 212 in tension, and the rear flange 214 in compression. This compression of the rear flange 214 tends to cause the rear flange 214 to buckle.

Thus, a benefit of the web 216 is preventing the buckling of the rear flange 214 during normal operation. The front flange 212 is strong enough that it will not tear, and thereby does not need as much support as the rear flange 214 does.

By providing struts 218 that extend substantially the entire width of the rear flange 214 and extend for only a small portion of the width of the front flange 212, the struts 218 can provide additional strength to the rear flange 214.

Some of the struts 218 are arranged in a zigzag relationship in which several of the struts 218 extend both downward and rearward from the front flange 212 to the rear flange 214. These struts 218 are shown with the subscript "r" in FIGS. 4, 5.

Some of the struts 218 are arranged in a zigzag relationship in which several of the struts 218 extend both upward and rearward from the front flange 212 to the rear flange 214. These struts are shown with the subscript "f" in FIGS. 4, 5.

Each strut 218f is formed integral with a first adjacent strut 218r at a forward end of the strut 218f. Said each strut 218f is formed integral with a second adjacent strut 218r at a rearward end of said each strut 218f.

Each strut 218r is formed integral with a first adjacent strut 218f at a forward end of said each strut 218r. Said each strut 218r is formed integral with a second adjacent strut 218f at a rearward end of said each strut 218r.

Each strut 218f is formed integral with a first adjacent strut 218r and with front flange 212 at a forward end of the strut 218f. Said each strut 218f is formed integral with a second adjacent strut 218r and with the rear flange 214 at a rearward end of said each strut 218f.

Each strut 218r is formed integral with a first adjacent strut 218f and with front flange 212 at a forward end of the strut 218r. Each strut 218r is formed integral with a second adjacent strut 218f and with the rear flange 214 at a rearward end of said each strut 218r.

Others of the struts 218 (extend both downward and forward from the rear flange 214 to the front flange 212. These struts 218 are shown with the subscript "f" in FIGS. 4, 5.

These struts 218 meet to define triangular boxes 220 defined by two adjacent struts 218 (one strut 218f and one strut 218r) and the front flange 212, and defined by two adjacent struts 218 (one strut 218f and one strut 218r) and the rear flange 214. These triangular boxes 220 are provided on both sides of the finger 118, as can be seen best in FIGS. 4, 5.

This arrangement of the struts 218 (i.e. some extending simultaneously downward and forward and some extending simultaneously downward and backward) provides additional torsional stability to the finger 118. Even more torsional stability is provided by the arrangement of these struts 218 to define triangular boxes 220.

Torsional stability is of particular importance since finger 118 is curved forward at its lower end 202. This curvature is gradual and extends over substantially the entire length of the front flange 212. This forward curvature permits the lower end 202 of the finger 118 to engage the tops of the crop plant first.

The crop plants tend to be tangled, and therefore will exert transverse forces (i.e. a component of the total force that is generally parallel to the longitudinal extent of the bats 114).

Due to the forward curvature of the finger 118, these transverse forces tend to twist the finger 118 at its lower end 202 to the left and to the right.

In an alternative arrangement, shown in FIGS. 12 and 13, each strut 218 has been rotated about a transversely extending axis extending through the front to rear midpoint of the strut 218 until each strut 218 is substantially parallel to its two adjacent struts and equidistantly spaced therebetween.

In the arrangement of FIGS. 12 and 13, strut 218 is arranged with respect to its adjacent structure and with respect to the front flange 212 and the rear flange 214 to define generally rectangular boxes 222. These rectangular boxes 222 are defined by the front flange 212, the rear flange 214, and two adjacent struts 218. The struts 218, in the embodiment shown in FIGS. 12 and 13, are arranged to extend perpendicular to the front flange 212 and the rear flange 214.

The struts 218 in the embodiment shown in FIGS. 12 and 13 are configured to extend from the web 216 to the outer edges of the front flange 212 and the rear flange 214.

In another alternative arrangement, not shown herein, the struts 218 shown in FIGS. 1-11 can extend from the web 216 to the outer edges of the front flange 212 and the rear flange 214 in the same fashion as they are shown in FIGS. 12, 13.

Likewise, in an alternative arrangement, not shown herein, the struts 218 shown in FIGS. 1-11 can extend perpendicular to the front flange 212 and the rear flange 214 to define similar rectangular boxes 222.

In all of the arrangement shown herein, the web 216 is formed integral with the front flange 212 and the rear flange 214 and is fixed to these flanges at the transverse midpoint of the front flange 212 and the rear flange 214.

The invention claimed is:

1. A finger (118) that is elongate and has a longitudinal extent, for a reel (102) of an agricultural harvesting head, the reel (102) having a plurality of bats (114) disposed about a longitudinal rotational axis (116), wherein each of the plurality of bats (114) is configured to support a plurality of the fingers (118) that are spaced apart and mounted side-by-side on each of the plurality of bats, the finger (118), as considered in an upright position and facing in a forward direction of travel, comprising:
   an upper end configured for being mounted to one of the bats and an elongate upper portion joined to, and extending downwardly from, the upper end, the upper portion being in the form of an I-beam including a front flange (212) that extends in a longitudinal and a transverse direction, relative to a length of said upper portion;
   a rear flange (214) that extends in the longitudinal and the transverse direction and is spaced apart from the front flange (212);
   a web (216) that extends between the front flange (212) and the rear flange (214) and is integrally formed with the front flange (212) and the rear flange (214) and wherein a thickness of the web (216) in the transverse direction is less than the thickness of each of the front flange (212) and the rear flange (214) in a fore-and-aft direction; and
   struts (218) that are formed integrally with the web (216) and with the front flange 212 and the rear flange (214) and extend in a transverse direction.

2. The finger of claim 1, wherein adjacent struts (218) form a triangular box (220) with the front flange (212).

3. The finger of claim 1, wherein adjacent struts (218) form a triangular box (220) with the rear flange (214).

4. The finger of claim 1, wherein adjacent struts (218) form a rectangular box (222) with the front flange (212) and the rear flange (214).

5. The finger of claim 1, wherein adjacent struts (218) are generally parallel to each other and perpendicular to the front flange (212) and the rear flange (214).

6. The finger of claim 1, wherein the struts (218) extend in a lateral direction a greater distance adjacent to the rear flange (214) than adjacent to the front flange (212).

7. The finger of claim 1, wherein each adjacent pair of struts (218) meets at an acute angle at the front flange (212) and one strut (218f) of each adjacent pair of struts (218) extending both upward and rearward from the front flange (212) to the rear flange (214), and another strut (218r) of said adjacent pair of struts (218) extending both downward and rearward from the front flange (212) to the rear flange (214).

8. The finger of claim 7, wherein the one strut (218f) of each adjacent pair of struts (218) meets the another strut (218r) of a next adjacent pair of struts (218) at an acute angle at the rear flange (214), thereby connecting the struts (218) connected together in a zigzag pattern.

9. The finger of claim 8, wherein each strut (218) is disposed at an acute angle with respect to the front flange (212), and is disposed at an acute angle with respect to the rear flange (214).

10. The finger of claim 1, wherein an extent of each of the front flange (212) and of the rear flange (214) in the transverse direction is at least three times the thickness of the web (216) in the transverse direction.

11. The finger of claim 1, wherein an extent of each of the front flange (212) and an extent of the rear flange (214) in the transverse direction is at least four times the thickness of the web (216) in the transverse direction.

* * * * *